US011279466B1

United States Patent
Kramer

(10) Patent No.: US 11,279,466 B1
(45) Date of Patent: Mar. 22, 2022

(54) SELF ADJUSTING VARIABLE PITCH AIRCRAFT PROPELLER

(71) Applicant: Robert M Kramer, Irving, TX (US)

(72) Inventor: Robert M Kramer, Irving, TX (US)

(*) Notice: Subject to any disclaimer, the term of this patent is extended or adjusted under 35 U.S.C. 154(b) by 0 days.

(21) Appl. No.: 17/460,014

(22) Filed: Aug. 27, 2021

Related U.S. Application Data

(60) Provisional application No. 63/163,240, filed on Mar. 19, 2021.

(51) Int. Cl.
  *B64C 11/34* (2006.01)
  *B64C 11/06* (2006.01)
(52) U.S. Cl.
  CPC .............. *B64C 11/34* (2013.01); *B64C 11/06* (2013.01)
(58) Field of Classification Search
  None
  See application file for complete search history.

(56) References Cited

U.S. PATENT DOCUMENTS

| 4,013,046 | A | * | 3/1977 | Kemp | F01C 3/02 418/113 |
| 4,362,467 | A | * | 12/1982 | Elliott | B64C 11/38 416/157 R |
| 4,678,402 | A | * | 7/1987 | Roe | B64C 11/42 416/157 R |
| 5,290,147 | A | * | 3/1994 | Karls | B63H 3/008 416/34 |
| 5,967,750 | A | * | 10/1999 | Elliott | B63H 3/08 416/157 R |
| 6,592,328 | B1 | * | 7/2003 | Cahill | F04D 29/362 416/214 R |

* cited by examiner

*Primary Examiner* — Michael Lebentritt
(74) *Attorney, Agent, or Firm* — Law Office of Jeff Williams PLLC; J. Oliver Williams

(57) ABSTRACT

A self adjusting variable pitch aircraft propeller assembly includes a mount, hub assembly and propeller. The mount has a threaded shaft and a slot. The hub assembly has a front hub and a rear hub, both the front hub and the rear hub have a hole for passage of the shaft. The propeller seats within the hub assembly and selectively rotates automatically in the hub assembly and the RPM of the engine increases and decreases. The propeller has a pin that is coupled to a sled in a slot of the mount. A spring and a nut are configured to be coupled around the threaded shaft with the spring between the hub assembly and the nut. The hub assembly is configured to translate along the mount in accordance with a speed of rotation of the hub assembly.

10 Claims, 7 Drawing Sheets

| Item | Label |
|---|---|
| 5 | Base |
| 6 | Mounting Holes |
| 7 | Hub Guide |
| 8 | Central Spring Guide |
| 9 | Threaded Shaft |
| 10 | Cotter Pin Hole |
| 11 | Sled |
| 12 | Bearing |
| 13 | Blade Pin Hole |
| 14 | Pusher Slot |
| 15 | Tractor Slot |

SELF ADJUSTING VARIABLE PITCH AIRCRAFT PROPELLER

CROSS REFERENCE TO RELATED APPLICATIONS

This application claims the benefit of an earlier filing date and right of priority to U.S. Provisional Application No. 63/163,240, filed 19 Mar. 2021, the contents of which is incorporated by reference herein in its entirety.

BACKGROUND OF THE INVENTION

1. Field of the Invention

The present application relates to a propeller for an aircraft, and more particularly to a self adjusting variable pitch aircraft propeller

2. Description of Related Art

A very common propeller type for an airplane is a ground adjustable, fixed pitch propeller is as it is inexpensive and simple to use. It does not require any pilot interaction to operate it during flight. This simplicity makes it a requirement for some aircraft types, for example, a Light Sport Aircraft. The simplicity though, results in much lower performance and efficiency then does an in-flight adjustable, variable pitch propeller.

A fixed pitch propeller is likely to limit an engines' power use to between 82 and 85 percent of its potential. This is because the fixed pitch setting chosen is usually a compromise between climb optimization (a finer pitch and higher power setting is required during climbing), and cruise optimization (a coarser pitch and lower power setting is required during cruising). Were the propeller able to vary its blade pitch automatically, greater performance and efficiency would result along with meeting the no pilot interaction requirement. This was the impetus for the invention.

Current technology variable pitch propellers require pilot interaction to operate during flight. They vary their blade pitch by direct input from the pilot during flight. Pilots typically interact with an engine oil pressure driven hydraulic system to adjust blade pitch. Alternatively, pitch may be varied through an electro mechanical device controlled by the pilot.

Although strides have been made, shortcomings remain. It is desired that an assembly be provided that permits automatic adjustment of propeller pitch during flight.

BRIEF SUMMARY OF THE INVENTION

It is an object of the present application to provide a Self Adjusting Variable Pitch Aircraft Propeller (SAVPAP). The SAVPAP assembly can take the place of most all currently available aircraft propellers that do not fully feather or provide reverse pitch. Both fixed pitch and variable pitch types can be replaced by the SAVPAP. The SAVPAP assembly is a variable pitch type. It varies propeller blade pitch automatically as aircraft engine throttle is adjusted during flight.

Blade pitch change is accomplished by the fore and aft movement of the propeller Hub working through a mechanism which converts this motion to a rotational force acting on the blades. Movement of the Hub is regulated by the compression and expansion of springs.

The moving Hub Assembly holds the blade roots against a fixed Mount. The blade roots are connected to the Mount through Pins that are fit into Bearing/Sled assemblies. The Sleds ride in Slots in the Mount. It is through these parts that the fore and aft movement of the Hub Assembly generate the rotational movement of the Blades. The rotation of the Blades changes their pitch.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
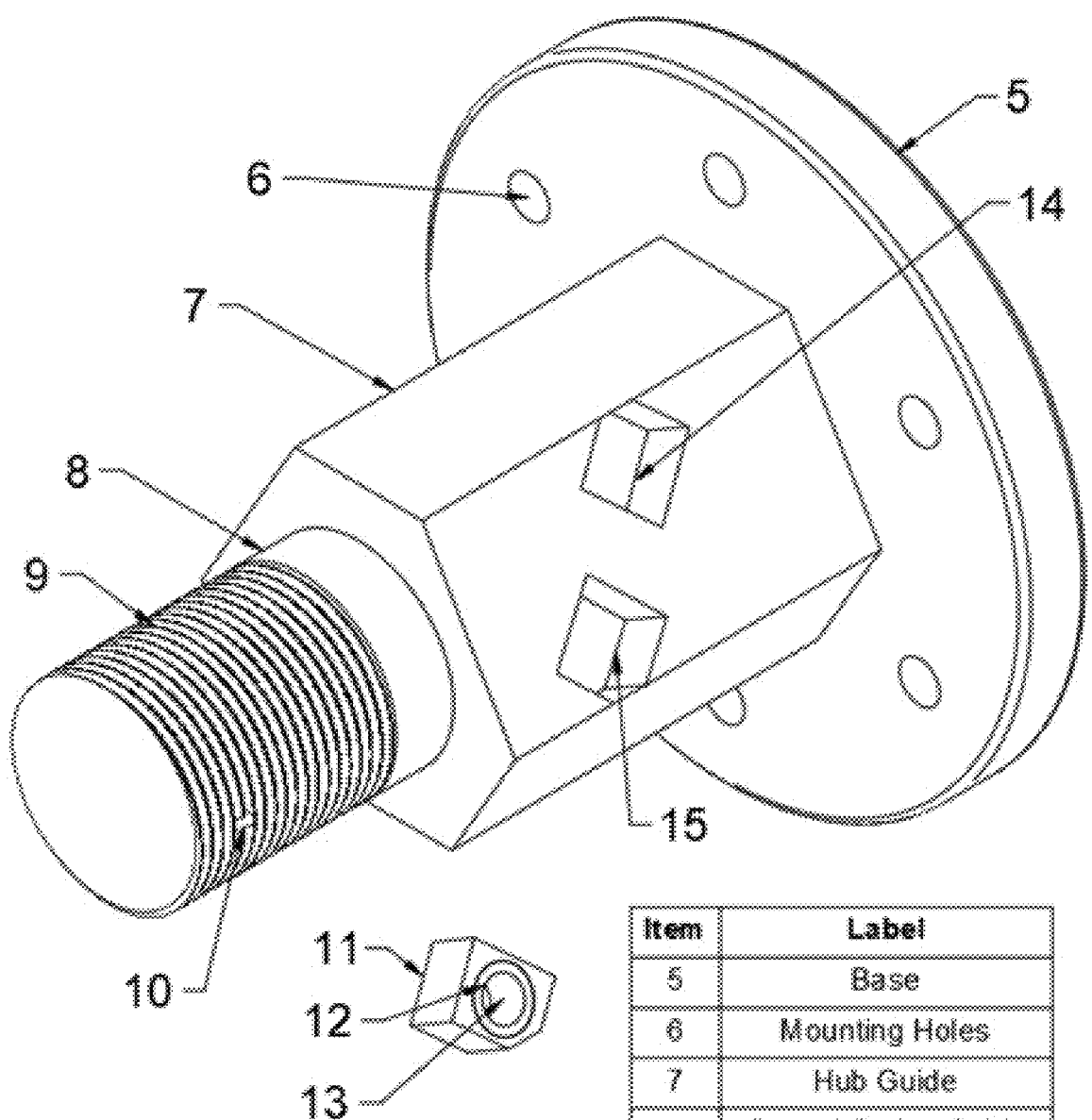
FIG. 1 is a perspective view of a mount in a self adjusting variable pitch aircraft propeller assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, The SAVPAP uses a self contained mechanism to automatically vary its blade pitch. The SAVPAP eliminates the need for complex, expensive, failure prone and heavy hydraulically or electronically controlled variable pitch propellers. The SAVPAP will allow the engine to use up to 100 percent of its power potential. In use, this difference will feel like an up to 18% increase in engine power.

While the invention process initially focused on a more limited application, it quickly became apparent that the SAVPAP design is more than capable of addressing a significant application base. The SAVPAP shown and modeled in this Specification is sized for application on a plane using an engine of around 100 horsepower like a Rotax 912ULS. The SAVPAP design can however, be scaled for use in either larger or smaller aircraft, with either larger or smaller engines. Its design flexibility is such that it will address the majority of all General Aviation single engine aircraft requirements. It can even be scaled down for use in model aircraft and UAV's. Further, while the SAVPAP shown and discussed in this specification is a 3 blade design, 2 and 4 blade variations can be made using the technology discussed herein.

Additionally, modifications to the initial design were added that allow certain of the propeller assembly parts to be reoriented such as to provide for use in either a pusher configuration (where the engine assembly is mounted at the rear of the aircraft), or a tractor configuration (where the engine assembly is mounted at the front of the aircraft). The pusher configuration is also used in airboat applications. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The Self Adjusting Variable Pitch Aircraft Propeller Assembly includes the elements and parts as illustrated and described below. Additional features and functions are illustrated and discussed below as well.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a mount used in the self adjusting variable pitch aircraft propeller assembly is illustrated. FIG. 1 depicts the SAVPAP Mount (5), in an example configuration suitable for mounting to a Rotax 912 ULS engine by using the Mounting Holes (6) and six flat head socket cap screws, nuts and washers. It is made of steel with the surfaces of the Hub Guide (7) and Slots (14) and (15), prepared to promote free movement of the contacting parts, Hub Assembly (FIG. 3), and Sleds (11). The Hub Guide (7), is shaped to allow the Hub Assembly (FIG. 3), and the Propeller Blade root (FIG. 2, Item 18), to move forward and backward freely along its surface without allowing it to rotate independently from the Mount (5).

Figure 2:
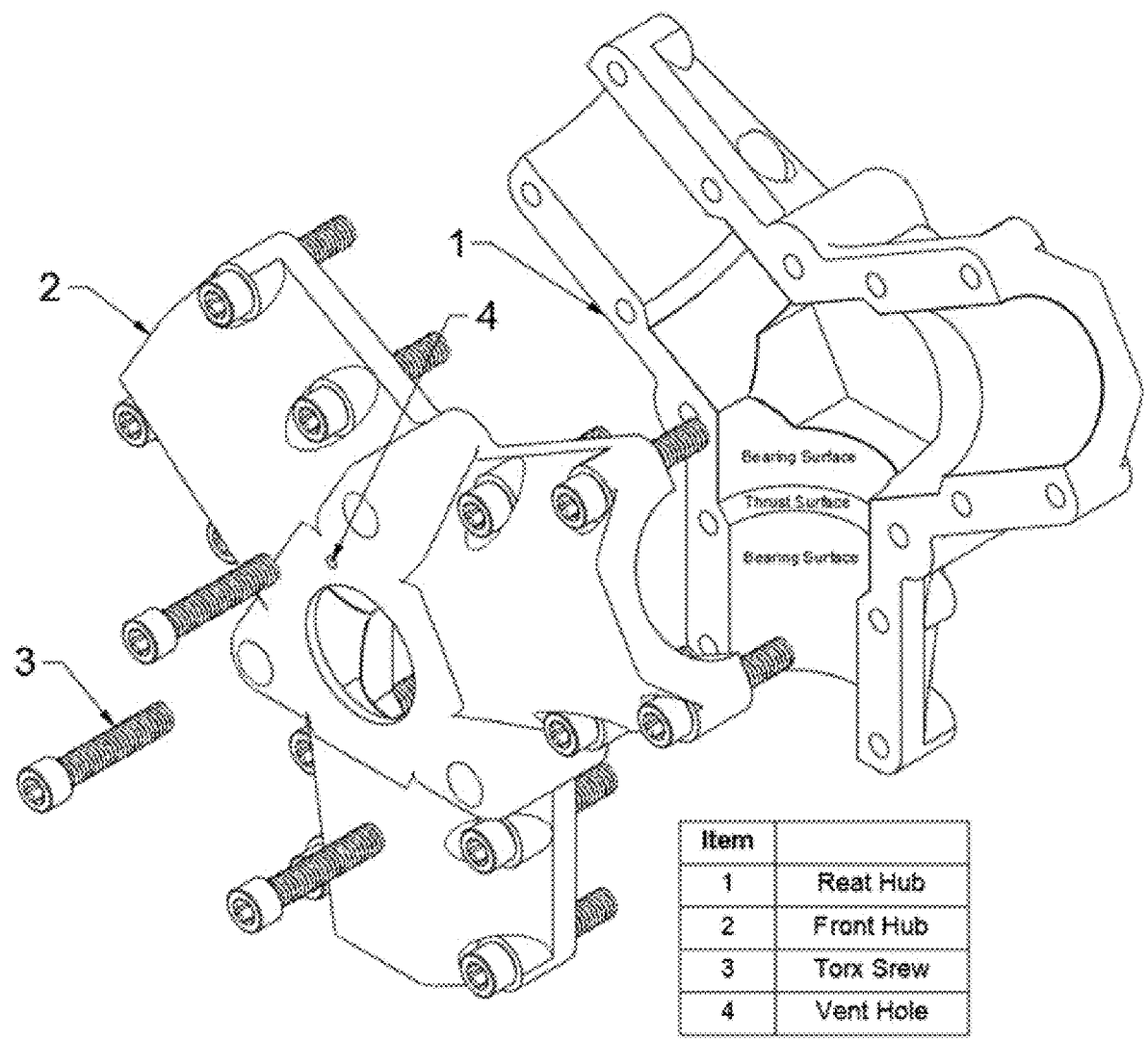
FIG. 2 is a perspective view of a hub assembly in the self adjusting variable pitch aircraft propeller assembly.

The Sleds (11), are also surface prepped to allow them to move freely back and forth in the Slots (14) and (15). A Bearing (12), is mounted into each of the Sleds (11), which house the Blade Pins (FIG. 2, Item 17). It is the Blade Pins (FIG. 2, Item 17), rotating in the Bearings (12), mounted in the Sleds (11), sliding in the Pusher Slots (14) or Tractor Slots (15), that convert the forward and backward motion of the Hub Assembly (FIG. 3), to a rotating motion of the Propeller Blades (FIG. 2, Item 18).

The rotating motion of the Propeller Blades (FIG. 2, Item 18), is the motion that creates the pitch change desired.

The Control Spring Guide (8), holds and orients the Wave Springs (FIG. 4, Item 20) and Spring Spacer (FIG. 4, Item 21), with everything secured to the Mount (5), by the Castellated Nut (FIG. 4, Item 22) and Cotter Pin (FIG. 4, Item 19), on the Threaded Shaft (9).

Referring now also to FIG. 2 in the drawings, a hub assembly used in the self adjusting variable pitch aircraft propeller assembly is illustrated. The SAVPAP Hub is comprised of distinct Front (2) and Rear (1) halves that are held together with 15 Torx bolts. The Hubs are made of aluminum with their interior surfaces prepped for corresponding part mating surface ease of movement. Corresponding parts consist of the Propeller Blades (Illustration 3), and Mount Hub Guide (Illustration 1, Item 7).

The Hub secures the Propeller Blades (Illustration 3), in a manner which keeps them snug to the Mount Hub Guide (Illustration 1, Item 7), as the assembly moves forward and back on it, and also such that they can also rotate within the Hub.

The area of the Hub that secures the Propeller Blades (Illustration 3), has areas that function as bearing surfaces, and areas that function as thrust surfaces. The Propeller Blades (Illustration 3), have corresponding areas where they mate to one another. The Bearing surfaces facilitate the Propeller Blades (Illustration 3), rotation in the Hub while the Thrust surfaces counteract the centrifugal forces that the Propeller Blades (Illustration 3), experience from the spinning of the SAVPAP assembly during aircraft operation.

Another byproduct of aircraft operation is the potential for adverse air pressures to develop inside the assembly so a Vent Hole (4), is used to eliminate that possibility.

Figure 3:
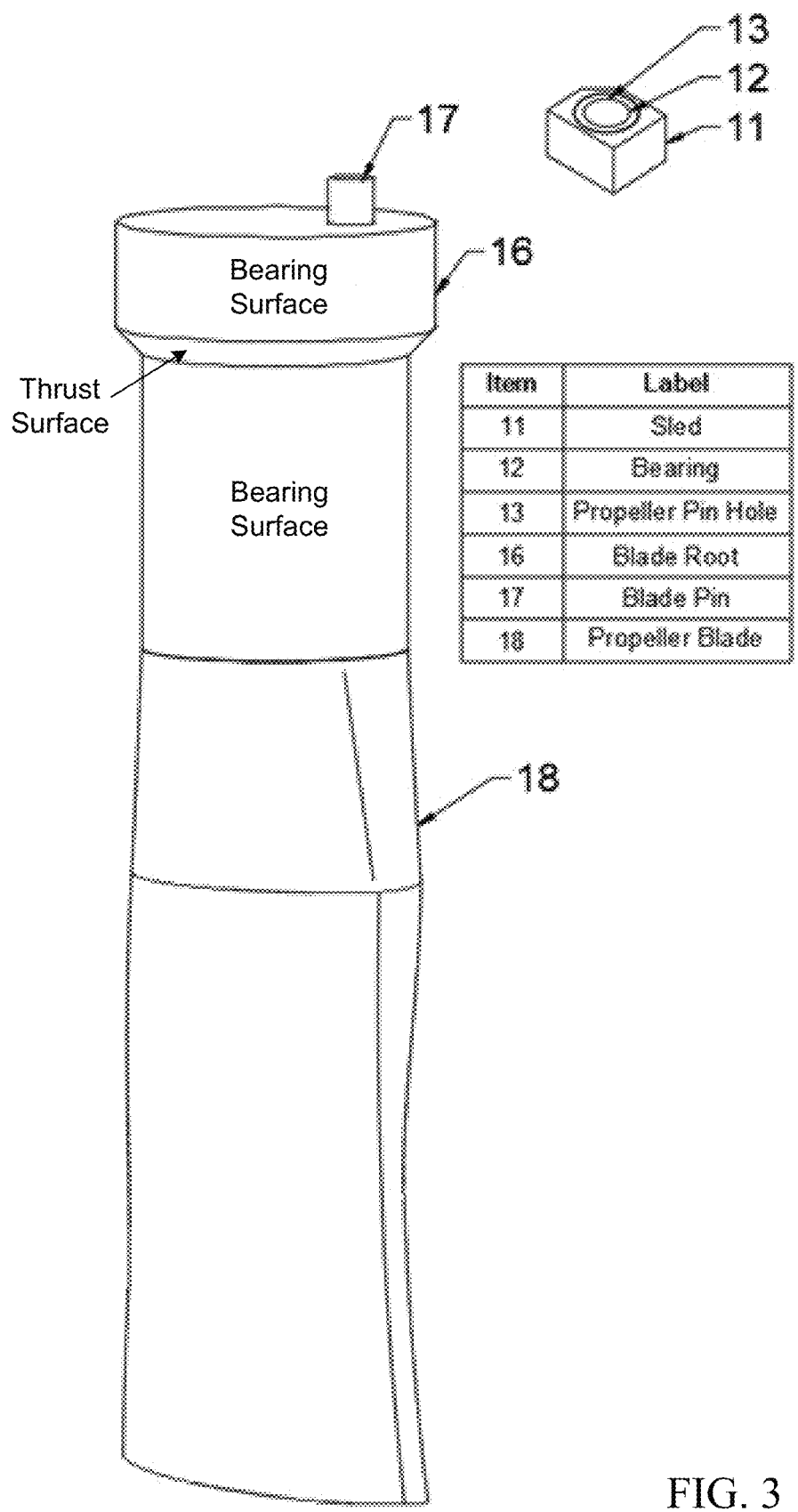
FIG. 3 is a propeller blade assembly in the self adjusting variable pitch aircraft propeller assembly.

Referring now to FIG. 3 in the drawings, a propeller blade used in the self adjusting variable pitch aircraft propeller assembly is illustrated. The Propeller Blade Assembly has two primary components; the Propeller Blade (18), which is made of carbon fiber or aluminum, and the Blade Root (16), which incorporates the Blade Pin (17), and is made out of aluminum.

As with the area of the Hub (Illustration 2), that secures the Propeller Blades, the Blade Root (16), has areas that function as bearing surfaces, and areas that function as thrust surfaces. The Bearing surfaces facilitate the Propeller Blade rotation in the Hub while the Thrust surfaces counteract the centrifugal forces that the Propeller Blades (Illustration 3), experience from the spinning of the SAVPAP assembly during aircraft operation.

The Blade Pin (17), fits inside the Bearing (12), which fits inside the Sled (11), which fits inside of the Slot (14 or 15), and is the part of the Blade Assembly that is acted upon by the fore and aft movement of the Hub Assembly on the Mount (Illustration 1), to change the pitch of the Propeller Blade Assembly during flight.

It should be understood that the propeller blade in the drawing is shown cut short to allow for an appropriate scale of the root to be shown.

Figure 4:
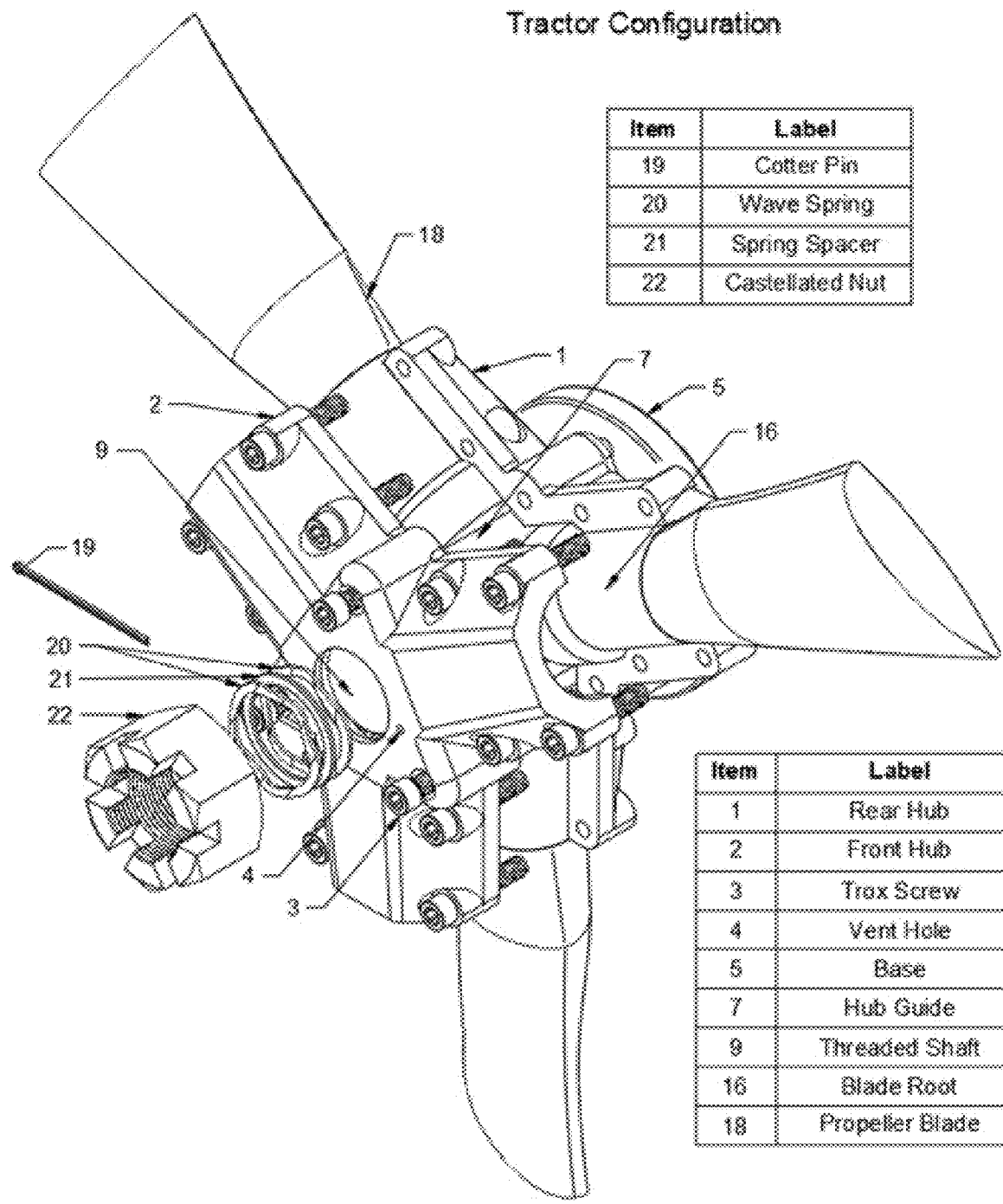
FIG. 4 is a perspective view of the self adjusting variable pitch aircraft propeller assembly in a tractor configuration.

Referring now to FIG. 4 in the drawings, a perspective view of the self adjusting variable pitch aircraft propeller assembly in a tractor configuration is illustrated. FIG. 4 depicts the SAVPAP assembly in the Tractor (pulling), configuration, with the Front Hub (2), and the parts forward of it "exploded".

In this configuration, the Blade Pin (17), Bearing (12), and Sled (11) combinations are fitted into the Tractor Slots (15) of the Hub Guide (7), and the Wave Springs (20) and Spring Spacer (21) are installed between the Castellated Nut (22) and the Front Hub (2).

Figure 5:
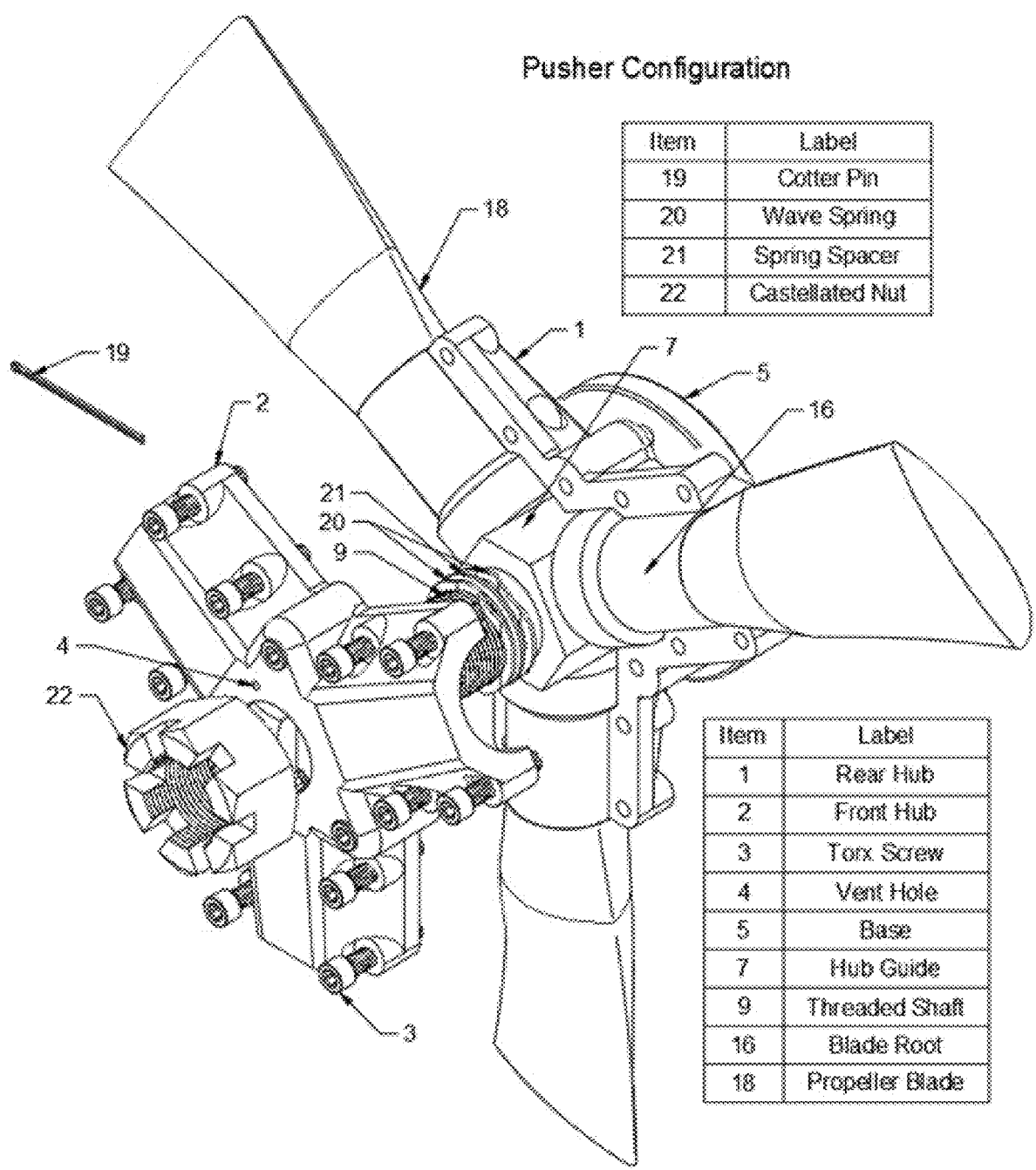
FIG. 5 is a perspective view of the self adjusting variable pitch aircraft propeller assembly in a pusher configuration.

Referring now to FIG. 5 in the drawings, a perspective view of the self adjusting variable pitch aircraft propeller assembly in a pusher configuration is illustrated. FIG. 5 depicts the SAVPAP assembly in the Pusher configuration, with the Front Hub (2), and the parts forward of it "exploded".

In this configuration, the Blade Pin (17), Bearing (12), and Sled (11) combinations are fitted into the Pusher Slots (14) of the Hub Guide (7), and the Wave Springs (20) and Spring Spacer (21) are installed between the Front Hub (2) and the Hub Guide (7).

Figure 6:
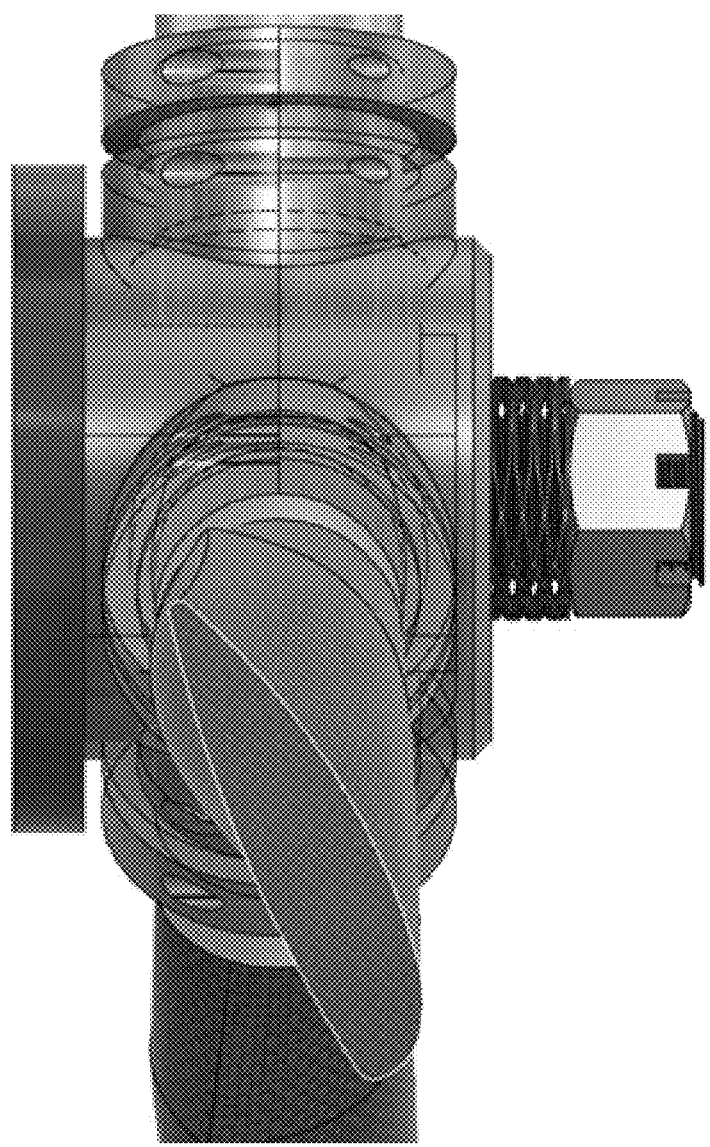
FIG. 6 is a side view of the self adjusting variable pitch aircraft propeller assembly of FIG. 4 at idle power.

Referring now to FIG. 6 in the drawings, a side view of the self adjusting variable pitch aircraft propeller assembly of FIG. 4 is illustrated. This Figure depicts the SAVPAP with the engine power at idle power. The propeller blades are at their maximum corse pitch position, with the Hub Assembly fully retracted on the Hub Guide (7). In this state, the Wave Springs (20), are nearly fully extended save for installation preload. This illustration is intended to be used as a picture of its state of operation, for comparison to the state of operation pictured in Illustration (7).

Figure 7:
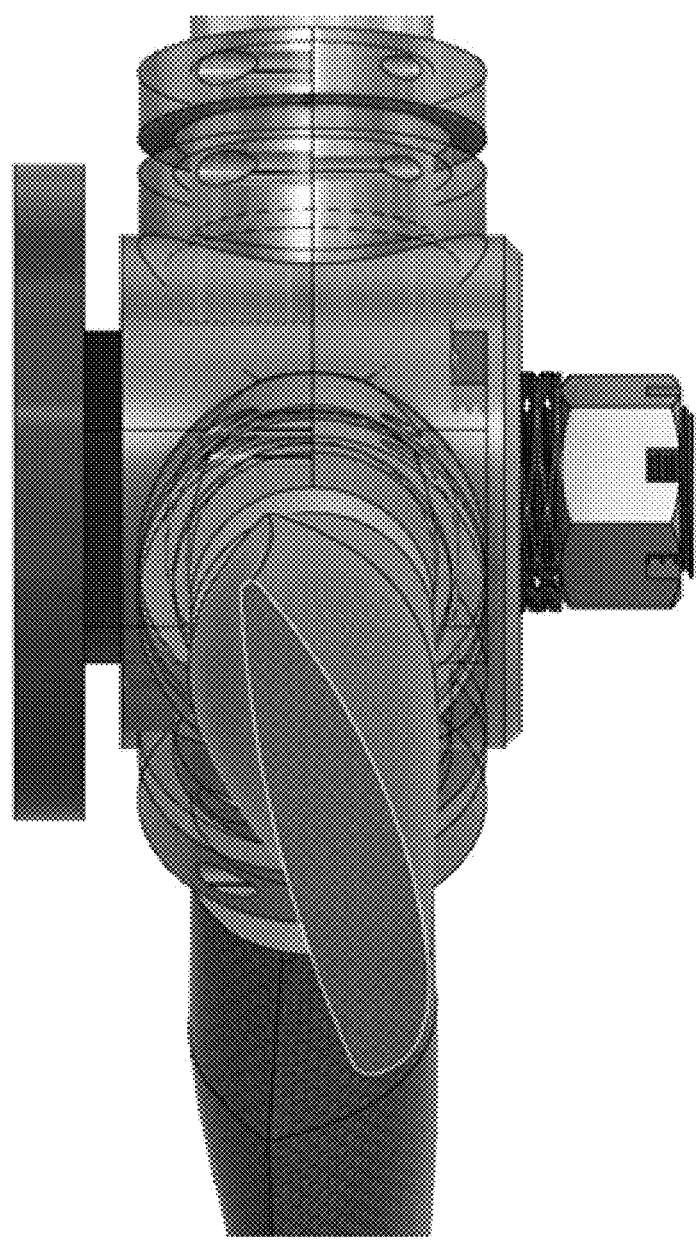
FIG. 7 is a side view of the self adjusting variable pitch aircraft propeller assembly of FIG. 6 at full power.

Referring now to FIG. 7 in the drawings, a side view of the self adjusting variable pitch aircraft propeller assembly of FIG. 6 is illustrated. This Figure depicts the SAVPAP with the engine at full power. The propeller blades are at their maximum fine pitch position, with the Hub Assembly fully forward on the Hub Guide (7), as thrust from the spinning blades has pulled it into that position. In this state, the Wave Springs are fully compressed. This illustration is intended to be used as a picture of its state of operation, for comparison to the state of operation pictured in Illustration (6).

The SAVPAP is a self contained aircraft propeller assembly that attaches to an aircraft engine in the same manner as do most. Its operation is what differentiates it from others. It varies blade pitch automatically; no pilot interaction is required, and it does so without the use of any hydraulically or electrically driven systems or devices as do the others variable pitch propellers. It is scalable for use in many single engine General Aviation aircraft. It can even be sized for use in Radio Controlled or UAV aircraft. It functions by reacting to changes in thrust experienced during normal flight operations.

As engine speed increases, the SAVPAP Hub Assembly is pulled forward on the Mount Hub Guide as the propeller blades develop thrust. This thrust generated forward movement is controlled and ultimately limited by a Wave Spring which is secured to the Mount shaft by a Castellated Nut and Cotter Pin. The amount of compression the Wave Spring experiences, determines the amount of blade pitch change that occurs. The spring compression type (progressive vs constant), determines the rate of pitch change generated. Fine tuning of the minimum and maximum RPM values desired is possible by altering the weight rating of the Wave Spring. This feature provides the potential to tune overall pitch change profiles. This gives the installer the ability customize the installation to suit a specific application requirement. Optimized characteristics can include cruise speed and efficiency, rate of climb, density altitude, min-max altitudes and others.

The propeller blade assemblies are held in the SAVPAP by the Hub Assembly. The individual blades are able to rotate within the Hub Assembly by virtue of mating surfaces machined on the Blade Roots and Front and Rear Hubs. Their mating surfaces incorporate both bearing and thrust surfaces. The bearing surfaces allow the Blade Assemblies to rotate in the Hub Assembly The thrust surfaces keep the Blade Assemblies from being ejected from the assembly in reaction to centrifugal force experienced from the blades spinning.

The bottoms of the Blade Roots are surfaced to match that of the Mount Hub Guide, to allow the Blade Roots to move smoothly over it. The Blade Roots have a Pin that is used to drive the rotation of the Blade Assemblies, which is their change in pitch. The Pins fit in a Bearing, which fits in a Sled, which rides in a Slot in the Mount Hub Guide. The forward movement of the hub and blade assembly is converted to the propeller blade rotation, by the Pins/Bearings/Sled in Slot mechanisms. These mechanisms cause the blades to rotate a specific amount and direction so as to increase or decrease the blade pitch the amount required to attain the desired torque profile. Changing the length and position of the Slots, changes the total amount of blade pitch change realized. This feature provides the potential to tune the SAVPAP climb and acceleration performance to match the specific engine in use on the individual aircraft.

As engine RPM is decreased, the Wave Spring pushes the Propeller Main Assembly backward on the Mount Hub Guide. The backward movement of the Main Assembly is transferred to the individual propeller blades through the Pin driven Sled in Slot mechanisms, which cause the blades to rotate a specific amount and direction so as to increase the blade pitch the amount required to attain the desired torque profile.

When replacing a fixed pitch type, the SAVPAP provides significant improvements in performance and efficiency by automatically reducing blade pitch as the aircraft engine RPM is increased, which allows the engine to generate more torque when needed (as during take off), and it increases blade pitch as engine RPM is decreased when less power is needed (as during cruise flight).

When replacing a current technology variable pitch propeller, the SAVPAP eliminates the need for both pilot interaction during flight and also the complex hydraulically or electrically driven subassemblies they require for operation. It accomplishes these tasks by automatically adjusting blade pitch as engine speed and resulting thrust are increased or decreased during normal operation.

The mode of operation can be described as follows. The SAVPAP may be manufactured in models appropriate to ranges of aircraft based largely on their gross weight and engine horsepower. Installers can fine tune the application for different min/max altitude operation expectations or other variables. By choosing the appropriate characteristics (resistance rate and curve), of the Wave Springs (20), the SAVPAP will deliver pitch changes to fit the desired application. Once installed, the SAVPAP operation is invisible to the operator/pilot save for the increased performance and efficiency.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A self adjusting variable pitch aircraft propeller assembly, comprising:
    a mount having a threaded shaft and a slot;
    a hub assembly having a front hub and a rear hub, both the front hub and the rear hub having a hole for passage of the shaft;
    a propeller configured to seat within the hub assembly, the propeller configured to selectively rotate in the hub assembly, the propeller having a pin;
    a sled configured to rest in the slot and in communication with the pin; and
    a spring and a nut configured to coupled around the threaded shaft with the spring between the hub assembly and the nut;
    wherein the hub assembly is configured to translate along the mount in accordance with a speed of rotation of the hub assembly; and
    wherein translation of the hub assembly engages the pin with the sled in the slot to induce rotation of the propeller.

2. The assembly of claim 1, wherein translation of the hub assembly is induced as the speed of rotation of the propeller changes.

3. The assembly of claim 1, wherein reduction in speed of rotation results in an extension of the spring.

4. The assembly of claim 1, wherein an increase in speed of rotation results in a compression of the spring.

5. The assembly of claim 1, wherein the slot is located on a hub guide on the mount.

6. The assembly of claim 1, wherein the slot is located on the mount for a tractor configuration.

7. The assembly of claim 1, wherein the slot is located on the mount for a pusher configuration.

8. The assembly of claim 1, wherein the amount of rotation of the propeller is set for a particular location of the hub assembly on the mount.

9. The assembly of claim 1, wherein the assembly qualifies for use in the light sport aircraft category.

10. The assembly of claim 1, wherein the location of the slot determines the configuration of the assembly as being suitable between a tractor configuration and a pusher configuration.

* * * * *